US011412798B2

(12) United States Patent
Yang

(10) Patent No.: US 11,412,798 B2
(45) Date of Patent: Aug. 16, 2022

(54) DEVICE FOR CURING HAIR AND LASH EXTENSION GEL

(71) Applicant: Cosmo Spa Lounge & Supply, Inc., Oakland, CA (US)

(72) Inventor: Soo-Jin Yang, El Cerrito, CA (US)

(73) Assignee: Cosmo Spa Lounge & Supply, Inc., Oakland, CA (US)

( * ) Notice: Subject to any disclaimer, the term of this patent is extended or adjusted under 35 U.S.C. 154(b) by 630 days.

(21) Appl. No.: 16/442,317

(22) Filed: Jun. 14, 2019

(65) Prior Publication Data

US 2020/0390173 A1 Dec. 17, 2020

(51) Int. Cl.
| | |
|---|---|
| *A41G 5/00* | (2006.01) |
| *A41G 5/02* | (2006.01) |
| *F21V 33/00* | (2006.01) |
| *H05B 45/10* | (2020.01) |
| *F21V 21/096* | (2006.01) |
| *B01J 19/12* | (2006.01) |

(52) U.S. Cl.
CPC .............. *A41G 5/0086* (2013.01); *A41G 5/02* (2013.01); *B01J 19/123* (2013.01); *F21V 21/0965* (2013.01); *F21V 33/0084* (2013.01); *H05B 45/10* (2020.01); *A41G 5/008* (2013.01)

(58) Field of Classification Search
CPC ........ A41G 5/0086; A41G 5/02; A41G 5/008; B01J 19/123; F21V 21/0965; F21V 33/0084; H05B 45/10
See application file for complete search history.

(56) References Cited

U.S. PATENT DOCUMENTS

| | | | | |
|---|---|---|---|---|
| 5,899,900 | A | * 5/1999 | Burke | .................... A61B 18/14 606/43 |
| 7,401,940 | B2 | * 7/2008 | Min | ....................... F21V 21/08 362/217.05 |
| 2003/0070998 | A1 | 4/2003 | Bulka | |
| 2016/0316840 | A1 | * 11/2016 | Yang | .......................... C09J 5/00 |
| 2018/0231237 | A1 | * 8/2018 | Zadro | ................. F21V 33/0084 |

FOREIGN PATENT DOCUMENTS

| | | |
|---|---|---|
| CN | 202288607 | 7/2012 |
| WO | 2009137941 | 11/2009 |

OTHER PUBLICATIONS

International Search Report and Written Opinion of the ISA, dated Oct. 29, 2020.

* cited by examiner

*Primary Examiner* — Evan P Dzierzynski
(74) *Attorney, Agent, or Firm* — Dergosits & Noah LLP

(57) ABSTRACT

An apparatus for curing adhesive gels used for lash and hair extensions. A housing includes a flexible tube extending from the front of the housing. An LED lamp is affixed within the flexible tube for illuminating a target area in front of the tube. A circuit is configured to drive the LED lamp. A front wedge is affixed to the bottom of the housing for holding and guiding a pair of tweezers for operation in the target area, and a rear wedge is affixed to the bottom of the housing in alignment with the first wedge for holding the back end of the pair of tweezers.

16 Claims, 10 Drawing Sheets

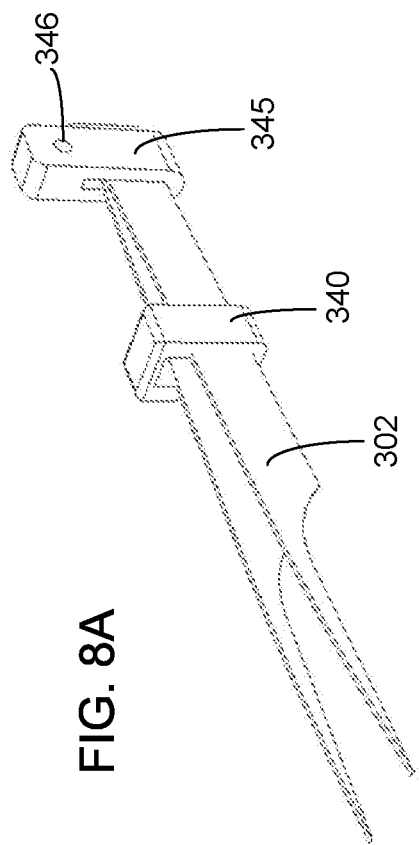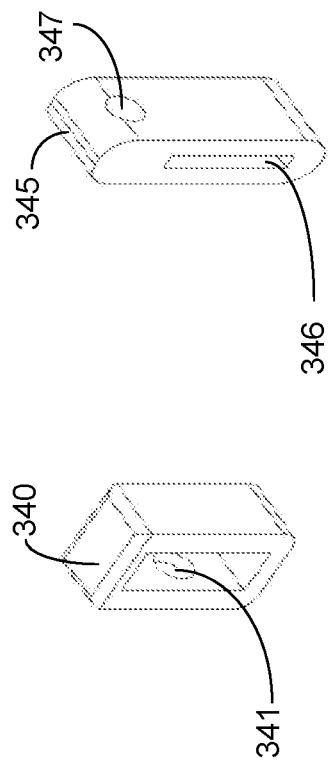
FIG. 8A
FIG. 8B

DEVICE FOR CURING HAIR AND LASH EXTENSION GEL

CROSS-REFERENCE

This application is related to U.S. patent application Ser. No. 15/143,118, which in turn claimed the benefit of U.S. Provisional Patent Application No. 62/155,902, both entitled "A Chemically Minimized System for Time Reduced Application of Eyelash Extensions," the contents of both applications are expressly incorporated by reference.

TECHNICAL FIELD

This application relates generally to the staging and attachment of extensions to hair, eyelashes, and eyebrows, and more particularly, to a device and method for using the device to cure application gel used to bond the extensions to target area.

BACKGROUND

The application of extensions for hair, eyelashes and eyebrows is generally known. However, the use of adhesive compounds for placing such extensions has been problematic since the compounds either do not dry fast enough, or their use causes unsightly and unacceptable clumping. Thus, it would be desirable to have a means for quickly and efficiently drying such compounds.

BRIEF DESCRIPTION OF THE DRAWINGS

FIGS. 8A and 8B are perspective views of an alternative tweezer holding device.

DETAILED DESCRIPTION

The following disclosure is directed to an apparatus for curing adhesive gels of the type used to bond extensions to hair, eyelashes or eyebrows. The apparatus is configured to accommodate tweezers for working with one or more extensions, and to emit light toward a target area between the tweezer arms for curing a photoactive gel used to bond the extensions.

Figure 1:
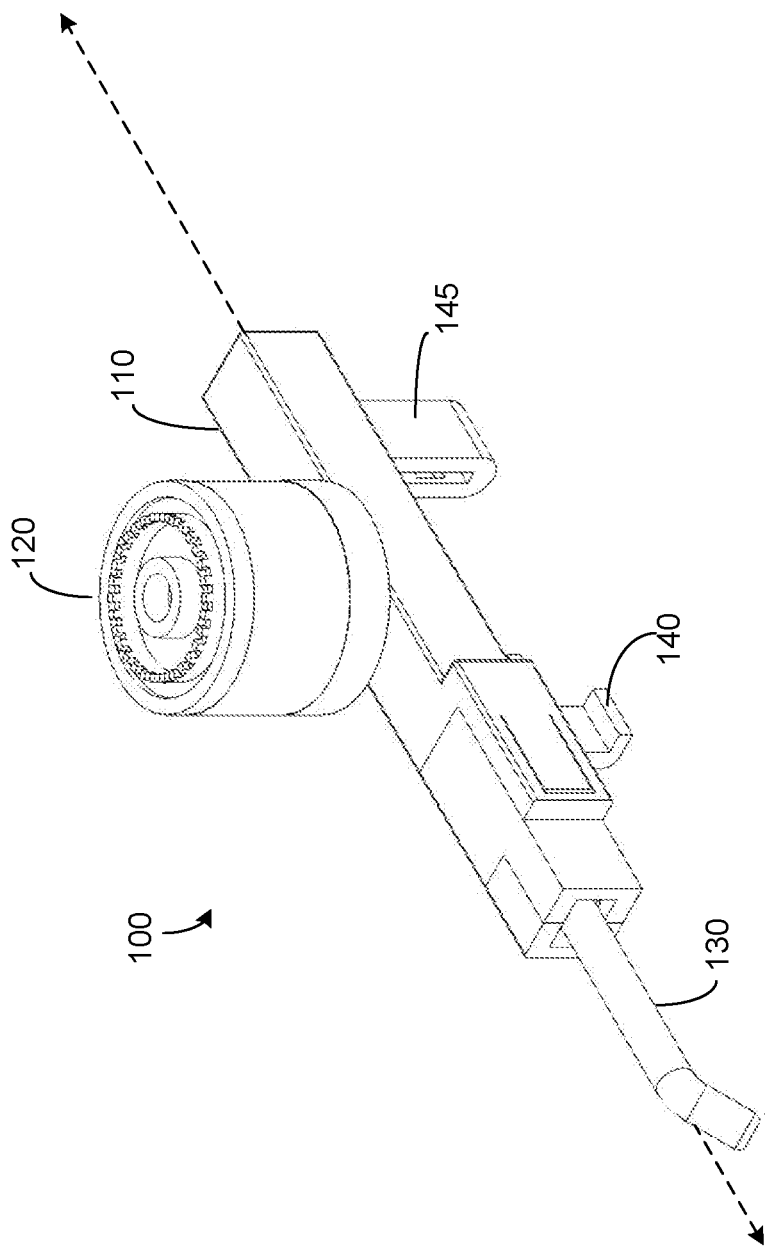
FIG. 1 is a perspective view from the front left of a gel curing device.
Figure 2:
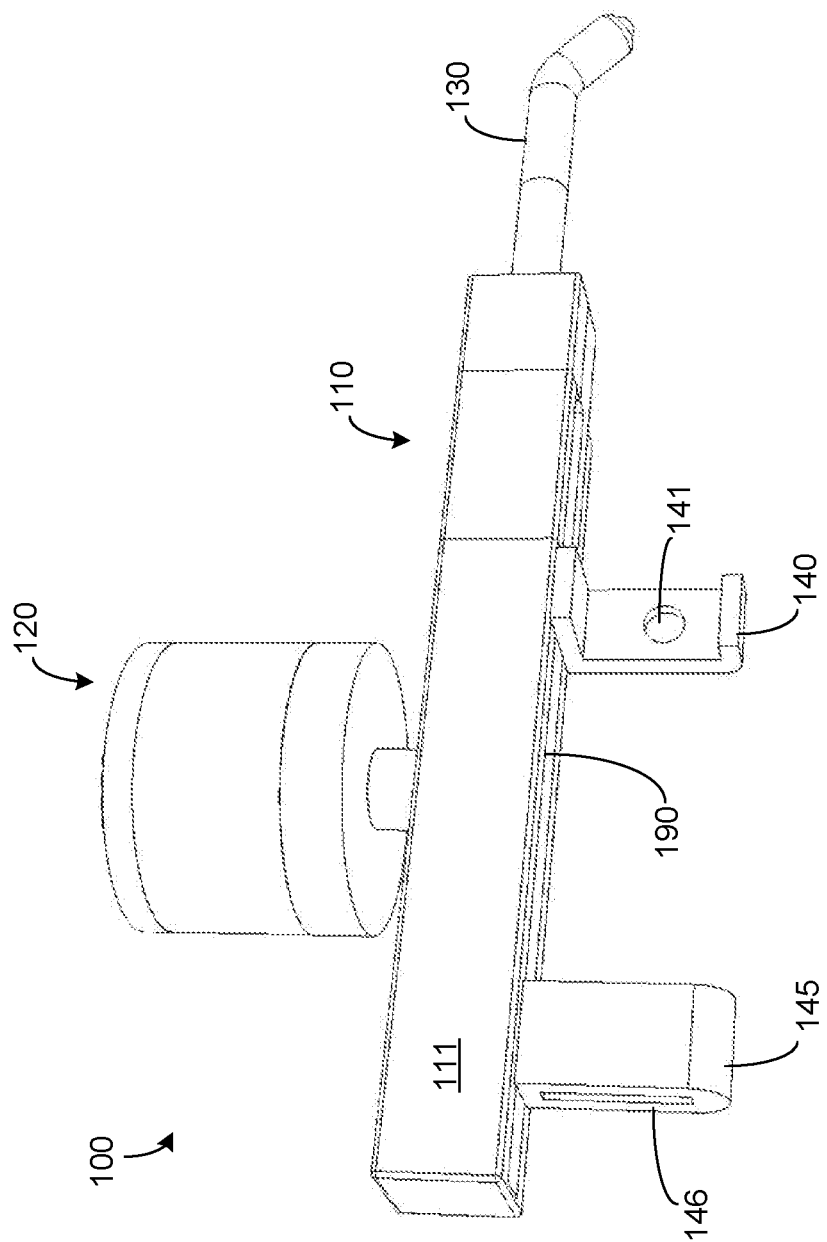
FIG. 2 is a perspective view from the right rear of the gel curing device of FIG. 1.
Figure 3:
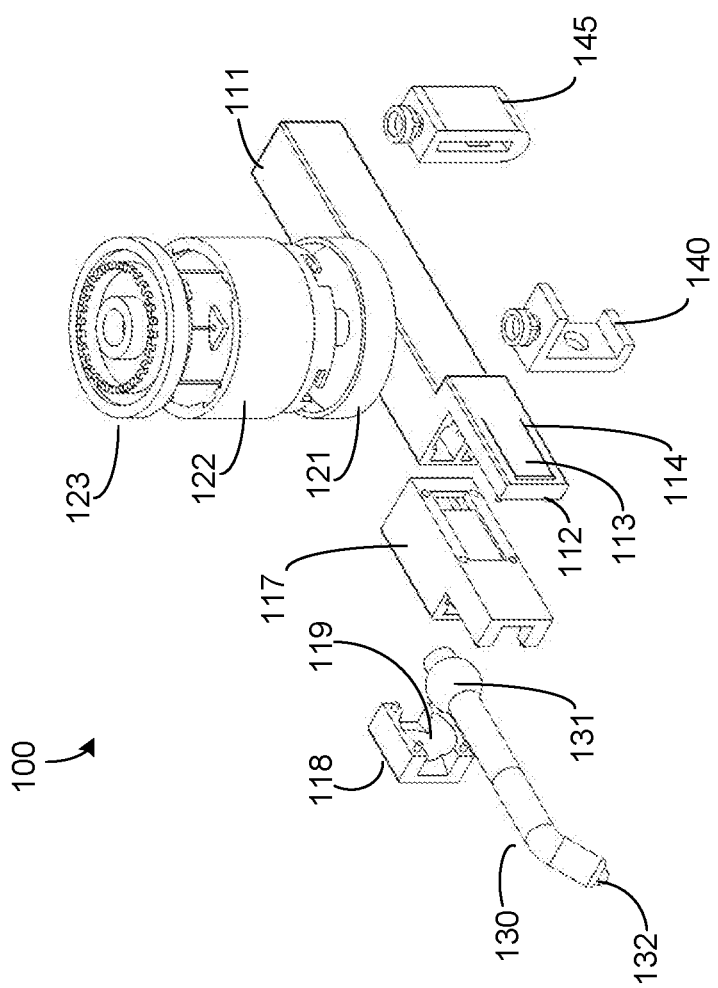
FIG. 3 is an exploded view of the gel curing device as shown in FIG. 1.
Figure 4:
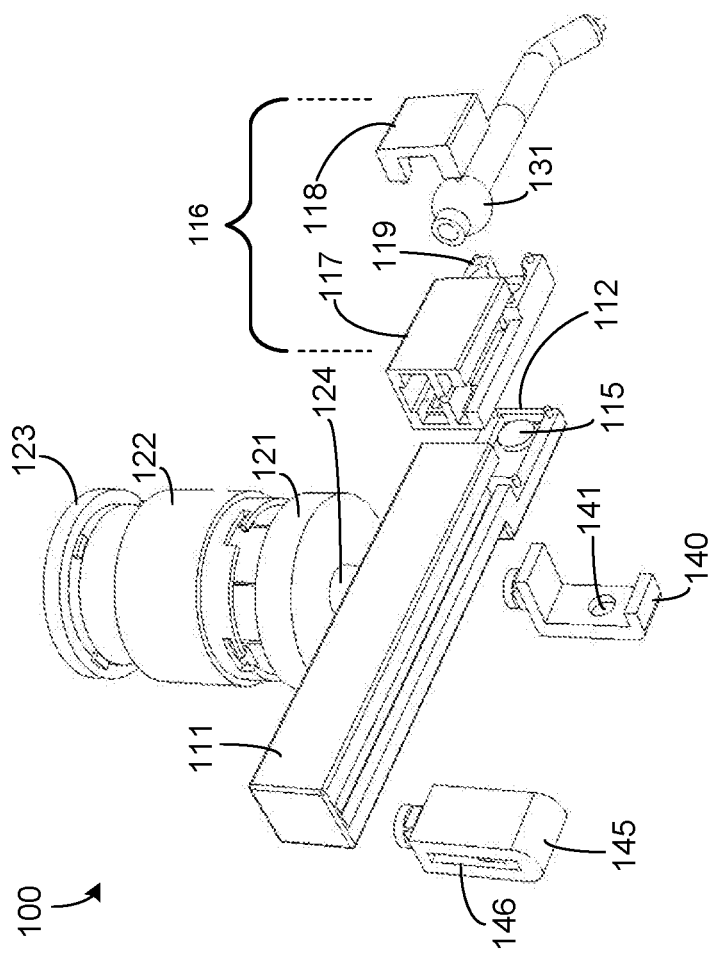
FIG. 4 is an exploded view of the gel curing device as shown in FIG. 2.

For example, FIGS. 1-4 illustrate one embodiment of a device 100 for curing gel-type adhesives, wherein FIGS. 1-2 are perspective views of the device and FIGS. 3-4 are corresponding exploded views of the device. The device 100 includes several component pieces, most of which may be individually formed of molded plastic or equivalent materials, then attached together using appropriate adhesives or other known methods; although it is conceivable that some or all of the components described herein, or equivalents, may be formed as a single integrated device or in a single mold. A main body 110 is a generally rectangular-shaped, hollowed-out box extending co-linearly with longitudinal axis A. A circuit housing 120 is mounted on top of the main body 110 and includes electronic circuitry and a battery. A light tube 130 is attached to the front of the main body 110. Preferably, the light tube 130 is flexible for easy maneuvering of the tube to better focus light on the target area. A pair of wedges 140, 145, or tweezer guides, are attached to the bottom of the main body 110

As best shown in the exploded views of FIGS. 3-4, the main body 110 includes a rectangular main housing 111 and a switch housing 116 attached to the main housing. The main housing portion 111 includes a tab 112 extending forward from one side of the rectangular housing; a switch detent 113 formed on the tab for engaging a switch, for example, formed by a u-shaped cutout 114 that allows the switch detent to simply be pushed to detect the action being taken to activate the light. The switch is thus coupled to a circuit board affixed on the inside of the tab within the detent/cutout.

The switch housing 116 includes an inside portion 117 and a cover 118 that snaps onto the inside portion. Both the inside portion 117 and the cover 118 include corresponding half-spherical sockets 119 configured within these parts to hold a swivel ball 131 that is affixed at the proximal end of the light tube 130. The swivel ball 131 fitted within the sockets 119 allows the flexible light tube 130 to be moved to some degree in order to better focus the emitted light onto a target area. The light tube 130 is flexible with a hollow interior for running wires to the LED.

The circuit housing 120 is affixed on top of the main body portion 110 and includes a base portion 121, a components housing 122, and a cap 123. The base portion 121 is attached to the main body 110 via a hollow post 124. An installed battery, such as a coin-cell type battery, powers the circuit board, and the circuit board has control wires running from the circuit board in the components housing 122 through the post 124 and into the main body 110 to a switch in the switch portion 116, which in turn is coupled to a light emitting diode 132 affixed at the end of the light tube 130.

Figure 5B:
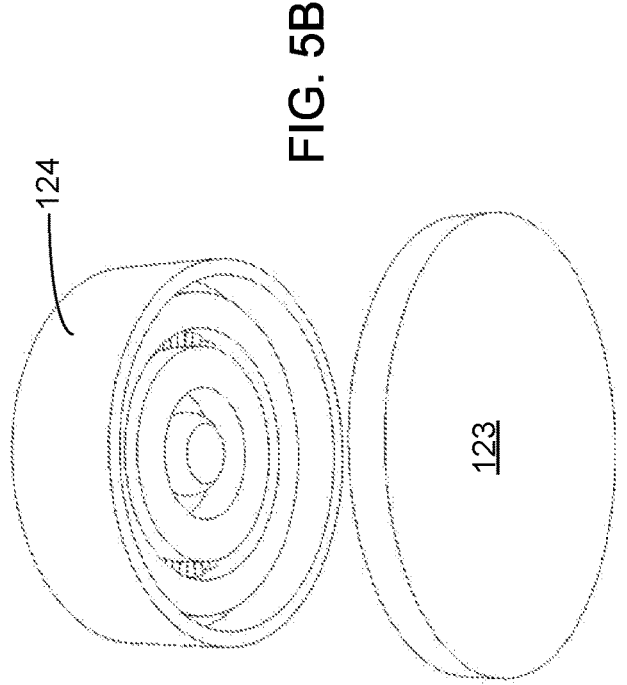
FIG. 5B is a perspective view illustrating a mold for use with the glue cap of FIG. 5A.
Figure 5A:
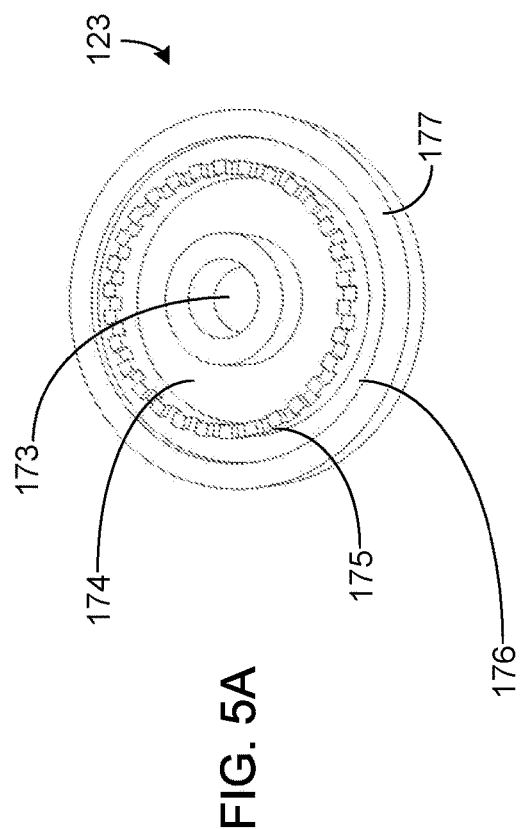
FIG. 5A is a perspective view of a glue cap.

FIG. 5A illustrates one embodiment of the cap 123. Advantageously, in this embodiment, the cap 123 is formed as shown to have, on top of the cap, a center bowl 173 for holding glue; a first catch basin 174 surrounding the center bowl; a top ring 175 formed with ridges to act as a glue reducer element, i.e., for dragging a attachment across the ridges of the top ring to minimize the glue on the attachment; a second catch basin 176 surrounding the top ring; and an outer wall 177 forming the periphery of the second catch basin.

FIG. 5B illustrates a mold 183 for use with the cap 123 as a press. For example, a piece of aluminum foil can be placed within the mold 183 and the press 123 is used with features of the mold to cut and shape the aluminum foil for placement on top of the battery cap.

Returning to FIGS. 1-4, the first wedge 140 and the second wedge 145 are separately attached to the bottom of the main housing 111. For example, in this embodiment, the main housing 111 is formed to include a channel 190 formed in the bottom of the housing and having a magnetic element therein to attract and hold both wedges 140, 145. Thus, the top of each wedge includes a magnetic tab 149 configured to ride within the channel 190, and be held by magnetic force, but still movable within the channel.

The first wedge 140 includes magnet 141 embedded in the side wall to attract and hold one of the tweezer arms in position against the side wall and a bottom lip. This allows the operator of the device to use only one finger on the free tweezer arm to close the tweezers. In another embodiment, the first wedge 140 would not have an open side, but would be closed (like the second wedge) with an opening to receive the tweezers and the size of the opening restricting the tweezers from opening all the way. The second wedge 145 has closed sides with an opening 146 through the wedge to allow the back end of the tweezers to be held in the opening. Thus, the position of the wedges 140, 145 may be adjusted within channel 190 to provide for operator comfort and/or different size tweezers.

In one possible implementation of the embodiment illustrated in FIGS. 1-4, the device 100 has the following approximate dimensions. The main housing 111 is 135 mm in length by 12 mm in width. The switch portion 116 is 15 mm wide. The components compartment 122 is 29 mm in diameter, and with the glue cap 123, is 23.5 mm in height. The post 124 is 5 mm in height. The light tube 130 including attached ball joint is 35 mm long, and is tilted at a 45 degree angle at the tip. The ball joint is 8 mm in diameter and allows the light tub 130 to swivel at least 15 degrees from the center line of the tube. The wedges 140, 145 are 18 mm in height. The channel 190 has a total length of 85 mm, with an adjustment range of 65 mm from front to rear of the channel.

A light emitting diode ("LED") 132 is the preferred means for curing application gel via photoinitiation, and in this embodiment, an LED is affixed within the light tube 130 such that light emitted from the open end of the tube. Preferably, the LED is operated with a power input that causes light emission at or near UV-A wavelengths within an approximate range of 315-400 nm, with a peak wavelength range between approximately 395-405 nm, and an average wavelength of 400 nm. In one preferred embodiment, the LED is driven at 405 nm. However, other wavelengths may be used depending on the application.

By incorporating a microprocessor as part of the LED control circuitry, the system can be programmed to drive the LED at UV-A frequencies, to shut off the LED in between each instance of energy application, and to control the density of energy flow through the use of pulse width modulation in the drive scheme. As one example, programmed operation can allow predetermined periods of exposure and delay for selected applications, thereby eliminating the need for an operator to attempt to determine appropriate periods of exposure and rest while operating the system. Such programming increases operational efficiency and LED life expectancy and reduces possibility of excessive emission exposure to target areas. Alternatively, the operator can manually control and adjust the duration and strength of the applied light based on experience.

The microprocessor may be connected to a wireless rechargeable circuit and battery, housed within the components compartment 122, and may be linked with a Bluetooth transmitter and receiver, as well as a micro controller and a safety shut off relay. Employment of a microprocessor may also allow the system to be operated in a wireless fashion.

Bonding of extensions is achieved with use of an application gel formulated using a combination of a monomer, such as ethylene glycol dimethacrylate, and a photoinitiator, such as trimethylbenzoylphenyl phosphinate. In a preferred formulation, the amount of photoinitiator in the application gel ranges from one percent to five percent. Other types of useful gel adhesives include UV and non-UV fluorescent cyanoacrylate adhesive compositions, bisphenol A diglycidylether-based adhesives, and epoxide groups. The application gel holds each application subject in place at the intended target area, and is curable from a viscous state to a hardened state by exposure to LED emissions.

Figure 6A:
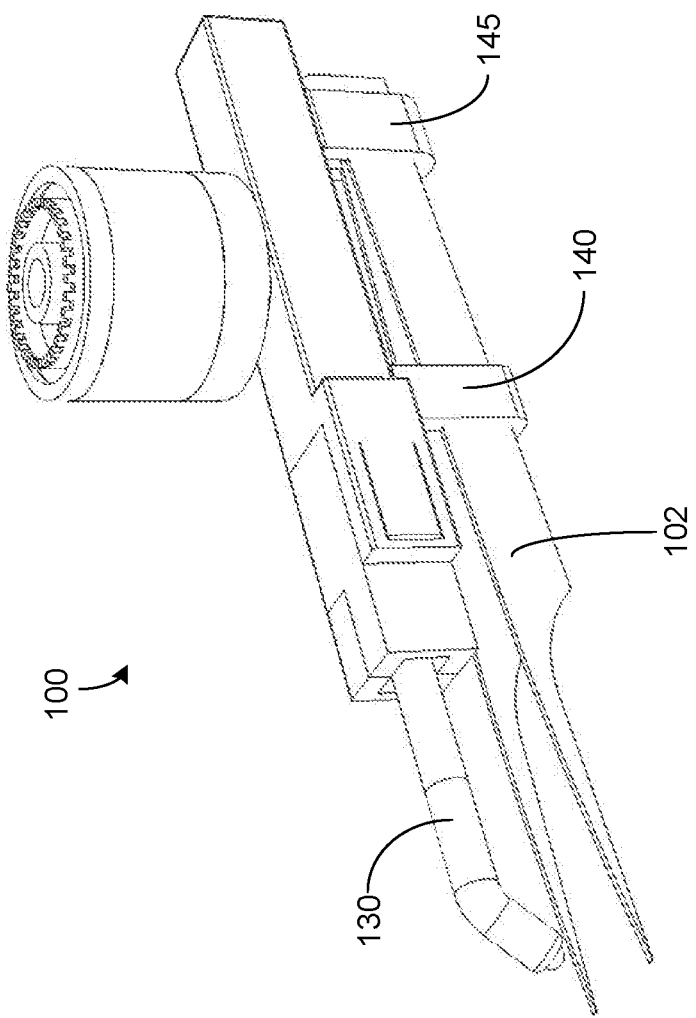
FIGS. 6A and 6B are perspective views of the gel curing device of FIGS. 1 and 2, respectively, with tweezers incorporated with the device.
Figure 6B:
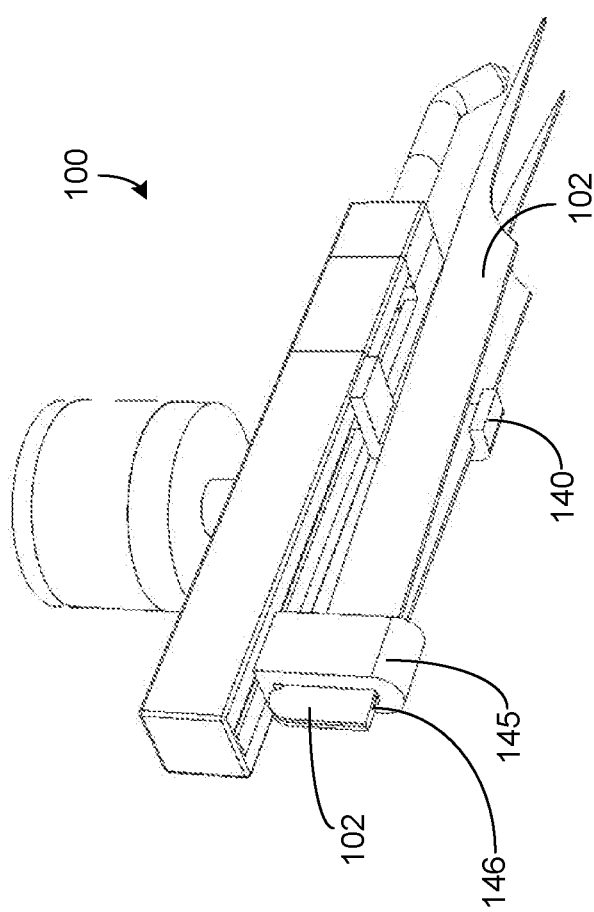
Figure 6C:
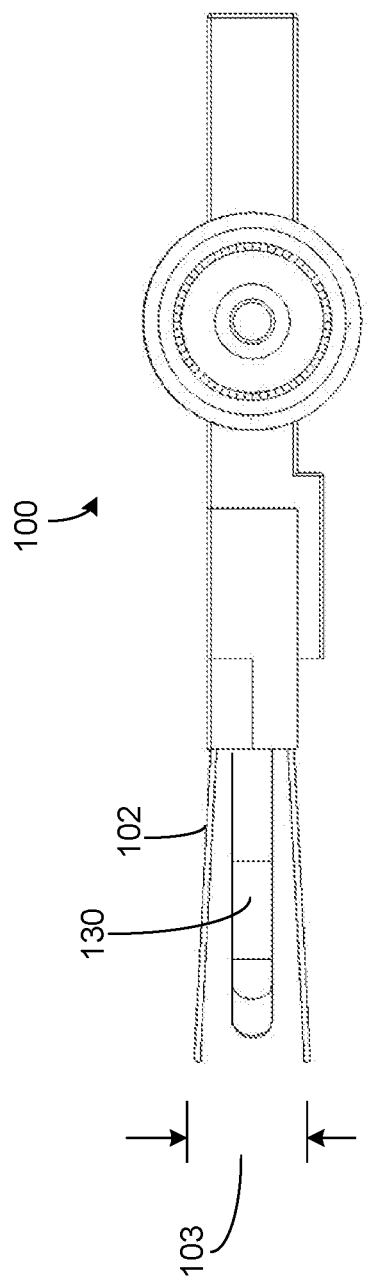
FIG. 6C is a top plan view of a gel curing device with incorporated tweezers.

In FIGS. 6A-6C, the device 100 is shown with tweezers 102 incorporated. In FIG. 6A, the tweezers 102 are held in place by wedges 140, 145, and the light tube 130 is aimed at the target area between the tips of the tweezers. In FIG. 6B, the back end of the tweezers 102 is placed through the opening 146 of the rear wedge 145, and one arm of the tweezers is held in place at the front wedge 140. The rear wedge 145 can be moved within channel 190 to squeeze or loosen the hold on tweezers 102. The opening 146 in the rear wedge 146 may restrict how open the tweezer arms can be, for example, limiting the gap 103 between the tips of a normal tweezer having an at rest gap opening of 10 mm to a gap range of between 2 mm-4 mm.

In an alternative embodiment, the first wedge 180 may be configured to include a sensor embedded with the wedge. The sensor detects the motion of the tweezers opening and closing, and as one example, the control circuit may be configured to initiate a programmed light cycle upon detecting that the tweezers were open, then closed, then open again, indicating the extension has been placed and released by the tweezers.

Figure 7:
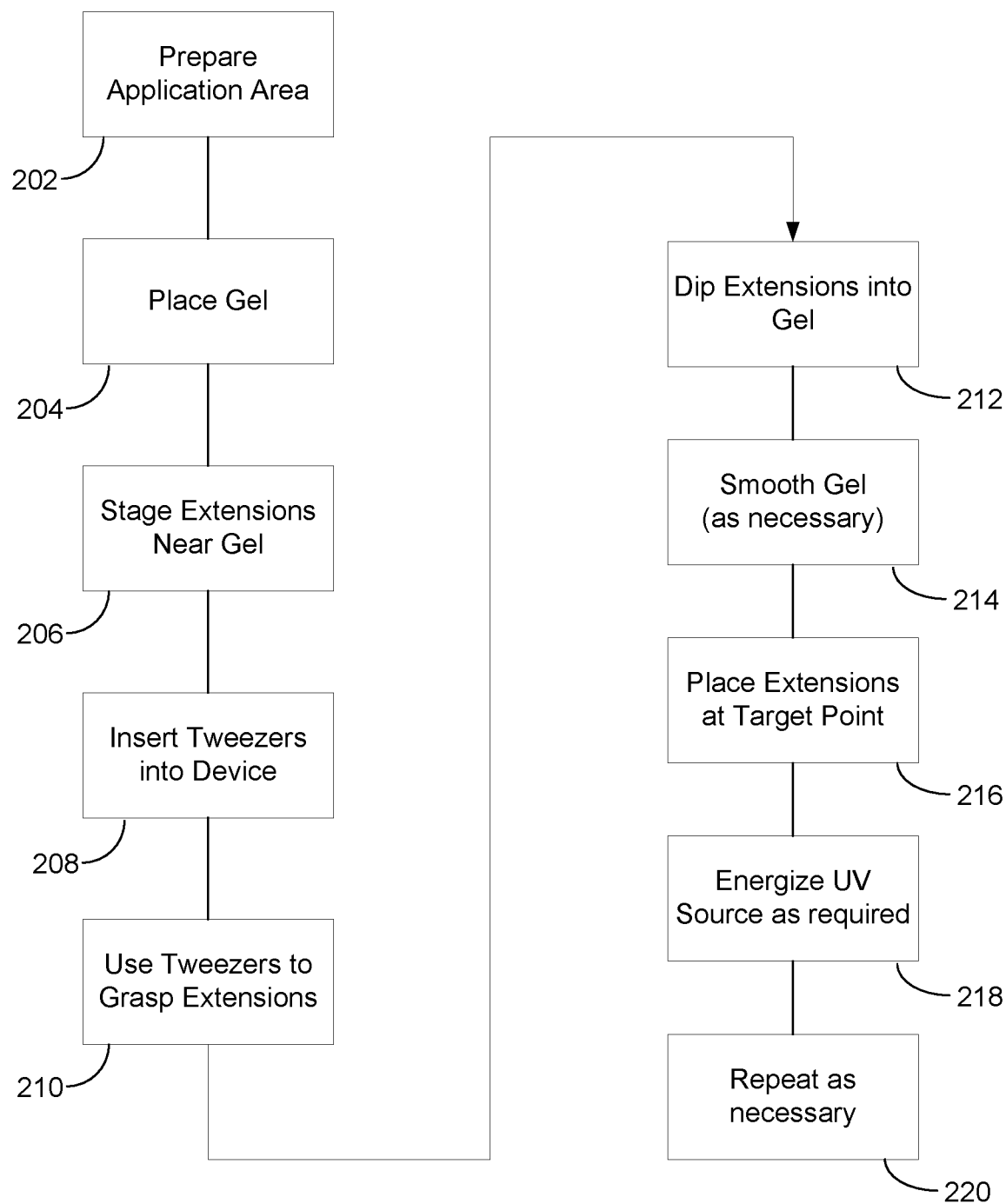
FIG. 7 is a flowchart of a process for using the device of FIG. 1 to cure application gel.

A method 200 for using the device 100 is illustrated in FIG. 7. In step 202, an application area is prepared for use. For example, one or more protective strips may be cut and placed to fit the contour of the application area. Any type of fabric including synthetic materials and cotton may be used for the protective strips. In one embodiment, the surface of the protective strips is coated with plastic to prevent the application gel from sticking to the protective strips.

The desired amount of application gel is placed in a convenient and suitable location in step 204. For example, the application gel can be placed on a plastic adhesive dish or another protective strip, or alternatively, the gel may be placed at the point of attachment. In step 206, the application subjects, e.g., a strip of eyelash extensions, are staged near the application gel. Often, the gel and strips are placed on the same lash and glue pallet, which is simply a flat surface made of glass, metal or plastic In step 208, if not already done, the operator inserts the tweezers 102 into the device 100, then uses the tweezers to grasp the desired number of application subjects, e.g., lashes or strand(s) of hair in step 210. In step 212, the base of the lash or hair is dipped into the application gel and placed at the target area, preferably less than ½ mm away from the eyelid or scalp. If necessary, a brushless micro applicator is used in step 214 to smooth out any application gel which may be uneven or clumping upon an application subject. Further, if a glue bowl 123 as shown in FIG. 5A is used, the ridges 175 can be used to wipe off excess gel after dipping. The brushless applicator may be attached to the tweezers, for example, by taping to the back end. The application subject with application gel is then placed at the desired point of attachment in step 216.

In step 218, the device 100 is operated to energize the UV light source as required to cure the application gel on the extension thus fixing the extension at the desired target position. Finally, in step 220, the process may be repeated as many times as necessary to achieve the desired result.

An alternative embodiment is illustrated in FIGS. 8A and 8B, where the wedges are used with tweezers in stand-alone manner. The first wedge 340 is o-shaped with a magnet 341 embedded in at least one of the sidewalls to hold one arm of the tweezers in place, and the opening 342 for receiving the tweezers. The second wedge 345 is more elongated, with a magnet 346 embedded in one of the sidewalls and a hole 347 for attaching a lanyard. The second wedge can be provided with a rounded bottom profile to make it more comfortable on the skin while holding tweezers.

Thus, the device 100 has numerous applications, including curing gel adhesive used with eyelash extensions; attaching individual or multiple strands of hair near the scalp to hair; and forming a string of gel to replicate the look of hair at the end of the natural lash to enhance length. Using a UV-curable gel allows it to be applied like a mascara and cured with light. Coating each eyelash strand with the curable gel thickens and lengthens the lashes to make them more visible. This technique also helps to hold a lash curl longer, for example, after a lash perm or the use of a lash curler. Extensions may be attached to the midpoint of the natural lash rather than at its base to extend length, rather at the base of the lash closest to the skin/eyelid.

Finally, different types of light may be used for different applications. For example, one type of light may be propagated for curing the application gel while another type of light might be propagated for precision lighting of a target area.

The foregoing description has been presented for the purpose of illustration and description only, and is not intended to be exhaustive or to limit the disclosure to the precise form disclosed. Many modifications and variations are possible in light of this disclosure.

The invention claimed is:

1. An apparatus, comprising:
a housing aligned around a longitudinal axis and having a front, rear, top and bottom;
a hollow tube having a proximal end attached to the front of the housing and extending from the housing to a distal end;
an LED lamp affixed within the distal end of the hollow tube and adapted to illuminate a target area proximate to the distal end of the hollow tube;
a circuit affixed with the housing and configured and connected to drive the LED lamp;
a first wedge coupled to the bottom of the housing and having a first channel oriented in parallel with the longitudinal axis, wherein the first channel is adapted to accept at least one arm of a pair of tweezers for operation of the pair of tweezers in the target area;
a second wedge coupled to the bottom portion of the housing and positioned to the rear of the first wedge, the second wedge having a second channel oriented in parallel with the longitudinal axis and aligned with the first channel, wherein the second channel is sized to accommodate a rear portion of the pair of tweezers; and
a magnet affixed to the first channel of the first wedge for magnetically holding the at least one arm of the pair of tweezers in place within the first channel.

2. The apparatus of claim 1, the housing further comprising:
a track formed along the bottom of the housing, wherein the first wedge is movably coupled within the track.

3. The apparatus of claim 2, wherein the second wedge is movably coupled within the track.

4. The apparatus of claim 1, wherein the LED lamp emits ultraviolet light.

5. The apparatus of claim 4, wherein the LED lamp emits ultraviolet light at or near UV-A wavelengths.

6. The apparatus of claim 1, the circuit further comprising:
a microprocessor programmed with instructions for driving the LED lamp.

7. The apparatus of claim 1, further comprising:
at least one sensor affixed with the first wedge and configured to detect an opening motion and a closing motion of the tweezers, wherein the circuit is configured to initiate a programmed light cycle based on the opening and closing of the tweezers.

8. The apparatus of claim 7, wherein the programmed light cycle is initiated when the sensor detects that the tweezers were opened, then closed, then open again.

9. The apparatus of claim 1, further comprising:
a compartment affixed to the housing, wherein the circuit is contained within the compartment and coupled with the LED lamp.

10. The apparatus of claim 1, wherein the hollow tube is flexible.

11. An apparatus, comprising:
a housing;
a flexible hollow tube attached to a front portion of the housing and extending from the front portion of the housing;
an LED lamp affixed within a distal end of the flexible hollow tube;
a circuit affixed with the housing and configured and connected to drive the LED lamp at or near UV-A wavelengths;
a first wedge affixed to a bottom portion of the housing and adapted to receive and hold a pair of tweezers for operation in a target area proximate to the distal end of the flexible hollow tube; and
a second wedge affixed to the bottom portion of the housing in alignment with the first wedge, the second wedge adapted to receive and hold a rear portion of the pair of tweezers and coupled to the track and movable along the track.

12. The apparatus of claim 11, the housing further comprising:
a track formed along a bottom portion of the housing, wherein the first wedge is coupled to the track and movable along the track.

13. The apparatus of claim 12, wherein the track includes a magnetic element, and the first wedge includes a first magnetic connector for coupling with the magnetic element of the track.

14. The apparatus of claim 11, the circuit further comprising:
a microprocessor programmed with instructions for driving the LED lamp.

15. The apparatus of claim 11, further comprising:
at least one sensor affixed with the first wedge and configured to detect movement of the tweezers, wherein the circuit is configured to initiate a programmed light cycle based on the movement of the tweezers.

16. The apparatus of claim 11, the circuit configured to drive the LED lamp at a wavelength of 405 nm.

* * * * *